(12) United States Patent
Ward et al.

(10) Patent No.: US 11,694,688 B2
(45) Date of Patent: *Jul. 4, 2023

(54) PLATFORM SELECTION FOR PERFORMING REQUESTED ACTIONS IN AUDIO-BASED COMPUTING ENVIRONMENTS

(71) Applicant: GOOGLE LLC, Mountain View, CA (US)

(72) Inventors: Chad Ward, Mountain View, CA (US); Bogdan Caprita, Mountain View, CA (US); Yilei Wang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,411

(22) Filed: Aug. 30, 2021

(65) Prior Publication Data

US 2021/0390956 A1     Dec. 16, 2021

Related U.S. Application Data

(63) Continuation of application No. 16/466,248, filed as application No. PCT/US2019/030809 on May 6, 2019, now Pat. No. 11,107,470.

(60) Provisional application No. 62/668,207, filed on May 7, 2018.

(51) Int. Cl.
*G10L 15/22* (2006.01)
*G10L 15/18* (2013.01)
*G06F 9/48* (2006.01)

(52) U.S. Cl.
CPC .......... *G10L 15/22* (2013.01); *G06F 9/4843* (2013.01); *G10L 15/1822* (2013.01); *G10L 2015/223* (2013.01)

(58) Field of Classification Search
CPC ........................ G10L 15/22; G10L 15/1822
See application file for complete search history.

(56) References Cited

U.S. PATENT DOCUMENTS

| 2002/0133571 A1 | 9/2002 | Jacob | |
| 2011/0093567 A1* | 4/2011 | Jeon | G06F 9/5072 |
| | | | 709/219 |

(Continued)

FOREIGN PATENT DOCUMENTS

| EP | 3312722 | 4/2018 |
| FR | 2858154 | 1/2005 |

(Continued)

OTHER PUBLICATIONS

Foreign Search Report on PCT/US2019/030809 dated Jul. 19, 2019. 354 pages.

(Continued)

*Primary Examiner* — Ibrahim Siddo
(74) *Attorney, Agent, or Firm* — Gray Ice Higdon

(57) ABSTRACT

Systems and methods of selecting digital platforms for execution of voice-based commands are provided. The system receives an application that performs an action associated with a service via digital platforms. The system debugs the application to validate parameters of the action on at least two platforms of the digital platforms. The system receives data packets comprising an input audio signal detected by a sensor of a client device, and parses the input audio signal to identify the action and the service. The system selects a first platform from the digital platforms to perform the action. The system initiates, responsive to selection of the first platform, an interactive data exchange to populate parameters of an action data structure corresponding to the action. The system executes the action via the selected platform using the action data structure.

20 Claims, 3 Drawing Sheets

(56) References Cited

U.S. PATENT DOCUMENTS

| | | | |
|---|---|---|---|
| 2014/0081633 A1 | 3/2014 | Badaskar | |
| 2015/0186110 A1 * | 7/2015 | Kannan | |
| 2016/0350101 A1 * | 12/2016 | Gelfenbeyn | G06F 8/65 |
| 2017/0046753 A1 | 2/2017 | Deupree, IV | |
| 2017/0178626 A1 | 6/2017 | Gruber et al. | |
| 2018/0039478 A1 | 2/2018 | Sung et al. | |
| 2018/0113857 A1 | 4/2018 | Mora López | |

FOREIGN PATENT DOCUMENTS

| | | |
|---|---|---|
| WO | 3237470 | 5/2002 |
| WO | 2013155619 | 10/2013 |
| WO | 2016111881 | 7/2016 |

OTHER PUBLICATIONS

European Patent Office; Communication Pursuant to Article 94(3) EPC issued in Application No. 19728789.9; 10 pages; dated Jul. 13, 2021.
China National Intellectual Property Administration; Notification of First Office Action issued in Application No. 201980002144.1; 16 pages; dated Nov. 28, 2022.
European Patent Office; Summons to attend oral proceedings issued in Application No. 19728789.9; 12 pages; dated Jan. 25, 2023.
China National Intellectual Property Administration; Notice of Allowance issued in Application No. 201980002144.1; 4 pages; dated May 9, 2023.

* cited by examiner

PLATFORM SELECTION FOR PERFORMING REQUESTED ACTIONS IN AUDIO-BASED COMPUTING ENVIRONMENTS

BACKGROUND

A voice based computing environment can interface with a variety of other computing platforms. For example, a service provider may provide a service via platforms including mobile applications, desktop applications, and web based applications. A user may interact with the service through the voice based computing environment. However, it can be challenging to select a platform for fulfilling a user request received through the voice based computing environment.

SUMMARY

At least one aspect is directed to a system to select digital platforms for execution of voice-based commands. The system can include a data processing system comprising at least one processor and memory. The data processing system can receive, from a service provider device, an application that performs an action associated with a service via a plurality of digital platforms. The data processing system can debug the application to validate parameters of the action on at least two platforms of the plurality of digital platforms. The data processing system can receive, via an interface of the data processing system, data packets comprising an input audio signal detected by a sensor of a client device. The data processing system can parse the input audio signal to identify the action and the service. The data processing system can select, based on a policy and at least one of the input audio signal or historical execution information, a first platform of the plurality of digital platforms to perform the action. The data processing system can initiate, responsive to selection of the first platform, an interactive data exchange to populate parameters of an action data structure corresponding to the action. The data processing system can execute the action via the selected platform using the action data structure.

The plurality of digital platforms can include at least one of a web-based application platform for the service, a mobile application platform for the service, and a conversational platform for the service. The data processing system can identify, for the action, first markup information indicating first parameters for the first platform of the plurality of digital platforms. The data processing system can identify, for the action, second markup information indicating second parameters for a second platform of the plurality of digital platforms. The data processing system can determine, based on a comparison of the first markup information and the second markup information, a conflict between the first parameters and the second parameters. The data processing system can provide, to the service provider device, an indication of the conflict.

The data processing system can identify, for the action, first parameters for the first platform of the plurality of digital platforms, and second markup information indicating second parameters for a second platform of the plurality of digital platforms. The data processing system can determine a conflict between the first parameters and the second parameters based on a comparison. The data processing system can transmit a prompt to the service provider device to resolve the conflict. The data processing system can determine that fewer parameters are configured for the conversational platform compared to the web-based application platform. The first platform can be a web-based application platform for the service and the second platform is a conversational platform for the service.

The data processing system can identify a conflict within the parameters of the action on at least two of the plurality of digital platforms. The data processing system can automatically resolve the conflict based on at least one policy stored by the data processing system.

The data processing system can identify a conflict within the parameters of the action on at least two of the plurality of digital platforms. The data processing system can automatically resolve the conflict by removing at least one parameter associated with the action on one of the at least two of the plurality of digital platforms.

The data processing system can identify, for the action, first parameters for the first platform of the plurality of digital platforms, and second markup information indicating second parameters for a second platform of the plurality of digital platforms. The data processing system can determine an inconsistency between the first parameters and the second parameters based on a comparison. The data processing system can retrieve, responsive to determination of the inconsistency, a resolution policy for the service provider device. The data processing system can resolve the inconsistency based on the resolution policy. The data processing system can determine the first platform is associated with a latest version update compared to the second platform. The data processing system can resolve, responsive to the determination that the first platform is associated with the latest version update, the inconsistency by updating the second parameters to match the first parameters.

The data processing system can select the first platform of the plurality of digital platforms based on a ranking policy. The historical execution information can include an indication of a previous platform executed to perform the action for the service responsive to a request from the client device. The data processing system can select the first platform based on the previous platform that executed the action being the first platform.

The data processing system can select the first platform based on a determination that execution of the action via the first platform utilizes less computing resources compared to execution of the action via a second platform of the plurality of digital platforms.

At least one aspect is directed to a method of selecting digital platforms for execution of voice-based commands. The method can be performed by a data processing system including at least one processor and memory. The method can include the data processing system receiving, from a service provider device, an application that performs an action associated with a service via a plurality of digital platforms. The method can include the data processing system debugging the application to validate parameters of the action on at least two platforms of the plurality of digital platforms. The method can include the data processing system receiving, via an interface of the data processing system, data packets comprising an input audio signal detected by a sensor of a client device. The method can include the data processing system parsing the input audio signal to identify the action and the service. The method can include the data processing system selecting, based on a policy and at least one of the input audio signal or historical execution information, a first platform of the plurality of digital platforms to perform the action. The method can include the data processing system initiating, responsive to selection of the first platform, an interactive data exchange to populate parameters of an action data structure corresponding to the action. The method can include the data processing system executing the action via the selected platform using the action data structure.

At least one aspect of the disclosure is directed to a system to fulfil requests in a voice based computing environment. The system can include a data processing system to receive computer instructions corresponding to a plurality of platforms for a service. The system can include a debugger component of the data processing system to perform debugging of the computer instructions to validate parameters of an action on at least two platforms of the plurality of platforms. The system can include a natural language processor component of the data processing system to receive, via an interface of the data processing system, data packets comprising an input audio signal detected by a sensor of a client device. The system can include the natural language processor component to parse the input audio signal to identify the action. The system can include a policy engine of the data processing system to select a first platform of the plurality of platforms for performing the action. The data processing system can initiate an interactive data exchange to populate parameters of an action data structure corresponding to the action. The data processing system can perform the action via the selected platform using the action data structure. The data processing system can receive the computer instructions corresponding to the plurality of platforms for the service by receiving computer instructions for at least one of a web-based application platform for the service, a mobile application platform for the service, and a conversational platform for the service. The debugger component can perform the debugging of the computer instructions to validate the parameters of the action on the at least two platforms by comparing markup information included in the at least two platforms to identify a conflict within the parameters of the action on the at least two platforms. The debugger component can identify a conflict within the parameters of the action on the at least two platforms; and can automatically resolve the conflict based on at least one policy stored by the data processing system.

At least one aspect of the disclosure is directed to a method of fulfilling requests in a voice based computing environment. The method can include receiving, by a data processing system, computer instructions corresponding to a plurality of platforms for a service. The method can include performing, by a debugger component executed by the data processing system, debugging of the computer instructions to validate parameters of an action on at least two platforms of the plurality of platforms. The method can include receiving, by a natural language processor component executed by a data processing system, via an interface of the data processing system, data packets comprising an input audio signal detected by a sensor of a client device. The method can include parsing, by the natural language processor component, the input audio signal to identify the action. The method can include selecting, by the data processing system, a first platform of the plurality of platforms for performing the action. The method can include initiating, by the data processing system, an interactive data exchange to populate parameters of an action data structure corresponding to the action. The method can include performing, by the data processing system, the action via the selected platform using the action data structure. The method can include receiving the computer instructions corresponding to the plurality of platforms for the service by receiving computer instructions for at least one of a web-based application platform for the service, a mobile application platform for the service, and a conversational platform for the service. The method can include performing the debugging of the computer instructions to validate the parameters of the action on the at least two platforms by comparing markup information included in the at least two platforms to identify a conflict within the parameters of the action on the at least two platforms. The method can include identifying a conflict within the parameters of the action on the at least two platforms; and can include automatically resolving the conflict based on at least one policy stored by the data processing system.

The individual features and/or combinations of features defined above in accordance with any aspect of this disclosure or below in relation to any specific embodiment of the disclosure may be utilized, either separately and individually, alone or in combination with any other defined feature, in any other aspect or embodiment of the disclosure.

Furthermore, the this disclosure is intended to cover apparatus configured to perform any feature described herein in relation to a method and/or a method of using or producing, using or manufacturing any apparatus feature described herein.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
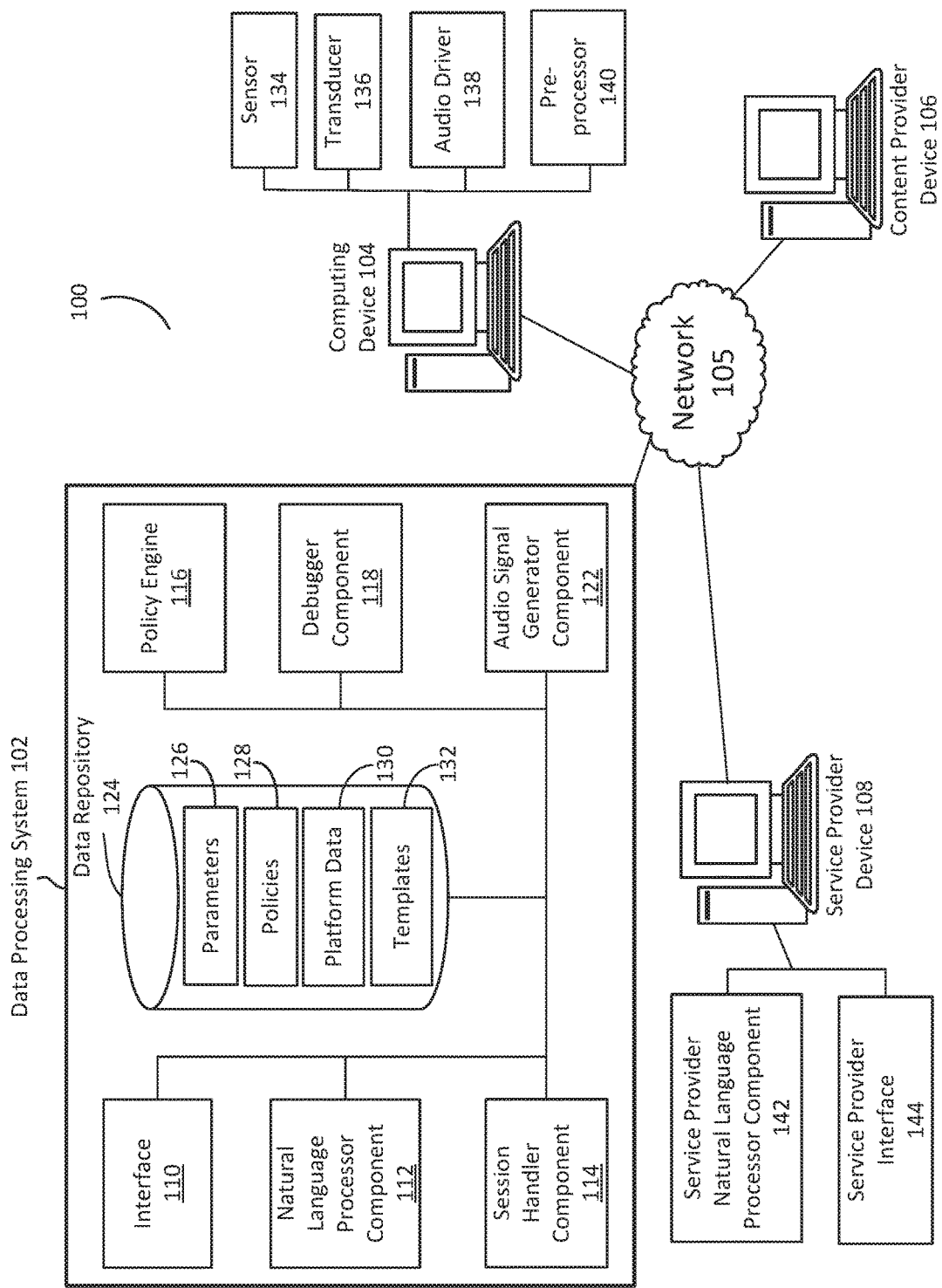
FIG. 1 is an illustration of a system to select digital platforms for execution of voice-based commands, and fulfill requests in a voice based computing environment.

Following below are more detailed descriptions of various concepts related to, and implementations of, methods, apparatuses, and systems of selecting digital platforms for execution of voice-based commands or fulfilling requests in a voice based computing environment. The various concepts introduced above and discussed in greater detail below may be implemented in any of numerous ways.

This disclosure is generally directed to selecting a digital platform to execute a voice-based command or fulfill a request in a voice-based computing environment. For example, an application developer or service provider can provide separate applications for separate digital platforms, such as a web-based application, a mobile application, and a conversational-based application such as a digital assistant platform. However, when a service provided by the service provider is invoked, it can be challenging for a computing device or system to determine which platform to select to execute the service, or provide a uniform and consistent data processing flow, because each application for each platform can be unique, contain different code format, perform different types of processing, or have access to different data sources. This may, ultimately, impede execution of particular actions by the computing device or system. Due to the different versions of applications configured for different digital platforms and the different interfaces available for each digital platform, it can also be challenging to provide a consistent user interface and data processing for the same action or service across the different digital platforms. Further, it can be challenging for the service provider or application developer to maintain, manage, and debug the different versions of applications across different digital platforms. For example, different developer teams may create applications configured for different digital platforms. Having separate versions of the application for each digital platform can increase electronic storage utilization on a server, and require different markup or tags on each application.

Thus, it can be challenging for disparate computing resource to effectively process instructions in a voice-based computing environment. For example, developers may enable services to be delivered to users via disparate computing resources, which can be referred to herein as platforms. A platform for a service can include an application that executes on a mobile device such as a cellular phone, an application that executes on a laptop or desktop computer, a web-based application accessible via a web browser application on a computing device, or a conversational application provided in a voice based computing environment.

A single service can be accessible via multiple platforms. As a result, when a user requests content relating to a service, for example via an audio based instruction in a voice based computing environment, a data processing system of the voice based computing environment must select one of the available platforms for fulfilling the request. However, it can be challenging to determine which platform is best suited for fulfilling a particular request. For example, selection of a particular platform may depend on factors including the user's preferences, the types of computing devices available to the user at the time the request is made, the type of service invoked by the request, and other factors. In addition, it can be useful to provide a uniform user experience for a particular service across the range of platforms that implement the service. For example, a user may expect that similar requests fulfilled via different platforms will generally produce similar results, and that such an interaction will be conducted in a similar manner regardless of the particular platform chosen.

This technical solution is generally directed to improving the effectiveness of information processing over disparate computing resources. Systems and methods of this technical solution are generally directed to selecting digital platforms for execution of voice-based commands, and fulfilling requests in a voice based computing environment. The voice based computing environment can include a data processing system. The data processing system can receive or access an application containing computer instructions corresponding to a plurality of platforms for a service. For example, the service may relate to requesting a ride through a ride sharing service, purchasing a movie ticket, reserving a table at a restaurant, booking a hotel room, playing music, etc. The application can include computer instructions corresponding to a mobile application for the service, instructions corresponding to a web-based application for the service, or instructions corresponding to a conversational platform, for example. The data processing system can determine an action for the service, as well as a plurality of parameters for the action. For example, an action may include purchasing a movie ticket, and the parameters may include a time, a movie title, and a theater location. The data processing system can be configured to extract tags or other forms of markup in the computer instructions relating to actions and parameters. The data processing system can determine whether the tags or markup information conflict with one another (e.g., if the parameters for an action defined for a web-based implementation of a service are not the same as the parameters for a corresponding action defined for a mobile application-based implementation of the service). The data processing system can validate whether the markup corresponds to a same action or service. The data processing system can automatically reconcile the differences resulting in the conflict or can prompt a developer of the computer instructions to address the conflict.

The data processing system can process voice-based input to determine an action corresponding to the voice-based input. The action can be associated with a service implemented across multiple platforms. Based on a set of rules or policies, the data processing system can select one of the platforms to be used for performing the action. The data processing system can initiate a data exchange to populate parameters of an action data structure for the action. For example, the data exchange may take place via conversational audio inputs from a user in response to conversational audio prompts generated by the data processing system. The data processing system can then perform the action via the selected platform using the action data structure.

For example, a music service provider can integrate their music application with a voice-based computing environment or digital assistant. The music service provider may already have a mobile application for the music service, but may not yet have created a version of the application for a digital assistant platform. The music service provider can add a header file to their mobile application that includes deep links and actions. A deep link can refer to a hyperlink that links to a specific web content, web page, or state within an application (e.g., a specific page for an artist page or album). The music service provider can provide the mobile application with the header file to a data processing system of the present technical solution. The data processing system can ingest the header file and import the header file to a digital assistant platform. The data processing system can use the ingested header file to perform a lookup to identify actions. For example, the data processing system can receive user voice input requesting a song, determine whether the user has access to the music service application to play the song, and then generate a deep link to access the song on the installed application for the music service. Thus, the data processing system can join or merge multiple digital surfaces or digital platforms to provide a unified and seamless user interface or flow.

The data processing system can determine that multiple digital platforms or surfaces are configured to provide a response to the request (e.g., play the song responsive to a request for the song). The data processing system can identify the multiple digital platforms, rank the digital platforms, and then select the highest ranking platform. The data processing system can use an index containing an indication of the song and all of the digital platforms that can provide access to the song in order to generate the list of available digital platforms. The data processing system can then rank the list of available digital platforms based on various factors, such as computing resource consumption associated with the digital platform, battery consumption, network utilization, cost, whether the application is installed on a client device, or historical preferences as to the type of application or digital platform used to fulfill the requested action.

FIG. 1 illustrates an example system 100 to select digital platforms for execution of voice-based commands, and fulfill requests in a voice based computing environment. The system 100 can include a data processing system 102. The data processing system 102 can communicate with one or more of a content provider computing device 106, service provider computing device 108, or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, personal digital assistant, smart phone, portable computers, or speaker. For example, via the network 105 a user of the computing device 104 can access information or data provided by a service provider 108 or content provider content provider device 106, such as one or more services that can be provided across one or more platforms. The platform may relate to a type of the computing device 104. For example, if the computing device 104 is a mobile computing device, the platform may include a mobile application executing on the computing device 104. If the computing device 104 is a desktop computing device, the platform may include a web-based application accessible via a web browser executing on the computing device 104. The computing device 104 may or may not include a display. For example, the computing device may include limited types of user interfaces, such as a microphone and speaker. In some cases, the primary user interface of the computing device 104 may be a microphone and speaker.

The network 105 can include or constitute a display network, e.g., a subset of information resources available on the internet that are associated with a content placement or search engine results system, or that are eligible to include third party content items as part of a content item placement campaign. The network 105 can be used by the data processing system 102 to access information resources such as applications, web pages, web sites, domain names, or uniform resource locators that can be presented, output, rendered, or displayed by the client computing device 104. For example, via the network 105 a user of the client computing device 104 can access information or data provided by the content provider computing device 106 or the service provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, the content provider device 106 (content provider 106), or the service provider device 108 (or service provider 108). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one service provider device 108. The service provider device 108 can include at least one logic device such as a computing device having a processor to communicate via the network 105, for example with the computing device 104, the data processing system 102, or the content provider 106. The service provider device 108 can include at least one computation resource, server, processor or memory. For example, service provider device 108 can include a plurality of computation resources or servers located in at least one data center. The service provider device 108 can include one or more component or functionality of the data processing system 102.

The content provider computing device 106 can provide content items for display by the client computing device 104 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 106 can also provide audio based content items (or other content items) to the data processing system 102 where they can be stored in the data repository 124. The data processing system 102 can select the audio content items and provide (or instruct the content provider computing device 106 to provide) the audio content items to the client computing device 104. The audio based content items can be exclusively audio or can be combined with text, image, or video data.

The service provider device 108 can include, interface, or otherwise communicate with at least one service provider natural language processor component 142 and a service provider interface 144. The service provider computing device 108 can include the at least one service provider natural language processor (NLP) component 142 or the at least one service provider interface 144. The service provider NLP component 142 (or other components such as a direct action API of the service provider computing device 108) can engage with the client computing device 104 (via the data processing system 102 or bypassing the data processing system 102) to create a back-and-forth real-time voice or audio based conversation (e.g., a session) between the client computing device 104 and the service provider computing device 108. The service provider NLP 142 can include one or more functions or features of the NLP component 112 of the data processing system 102. For example, the service provider interface 144 can receive or provide data messages to the direct policy engine 116 of the data processing system 102. The service provider computing device 108 and the content provider computing device 106 can be associated with the same entity. For example, the content provider computing device 106 can create, store, or make available content items for a car sharing service, and the service provider computing device 108 can establish a session with the client computing device 104 to arrange for a delivery of a taxi or car of the car share service to pick up the end user of the client computing device 104. The data processing system 102, via the NLP component 112 or other components can also establish the session with the client computing device, including or bypassing the service provider computing device 104, to arrange for example for a delivery of a taxi or car of the car share service.

The computing device 104 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can be configured to detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 104 can be associated with an end user that enters voice queries as audio input into the client computing device 104 (via the sensor 134) and receives audio output in the form of a computer generated voice that can be provided from the data processing system 102 (or the content provider computing device 106 or the service provider computing device 108) to the client computing device 104, output from the transducer 136 (e.g., a speaker). The computer generated voice can include recordings from a real person or computer generated language. The voice queries may correspond to requests for content via a service, which may be provided, for example, by the service provider device 108.

The data repository 124 can include one or more local or distributed databases, and can include a database management system. The data repository 124 can include computer data storage or memory and can store one or more parameters 126, one or more policies 128, platform data 130, or templates 132 among other data. The parameters 126, policies 128, and templates 132 can include information such as rules about a voice based session between the client computing device 104 and the data processing system 102 (or the service provider computing device 108). The platform data 130 can include computer instructions corresponding to services for a variety of platforms. For example, the platform data 130 can include executable code for a mobile application of a service, executable code for a desktop application of the service, executable code for a web-based application of the service, etc.

The data processing system 102 can include a content placement system having at least one computation resource or server. The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one policy engine 116. The data processing system 102 can include, interface, or otherwise communicate with at least one session handler 114. The data processing system 102 can include, interface, or otherwise communicate with at least one debugger component 118. The data processing system 102 can include, interface, or otherwise communicate with at least one audio signal generator 122. The data processing system 102 can include, interface, or otherwise communicate with at least one data repository 124. The at least one data repository 124 can include or store, in one or more data structures or databases, parameters 126, policies 128, platform data 130, or templates 132. Parameters 126 can include, for example, thresholds, distances, time intervals, durations, scores, or weights. Policies 128 can include, for example, ranking policies, selection policies, or resolution policies used to resolve inconsistencies or conflicts.

The interface 110, natural language processor component 112, session handler 114, policy engine 116, debugger component 118, or audio signal generator component 122 can each include at least one processing unit or other logic device such as programmable logic array engine, or module configured to communicate with the database repository or database 124. The interface 110, natural language processor component 112, session handler 114, policy engine 116, debugger component 118, audio signal generator component 122 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can receive, from a service provider device 108, an application. The application can be developed by a service provider associated with the service provider device 108. The application can be developed using the service provider device 108, or transmitted to the data processing system 102 using the service provider device 108. The application can include an application configured to provide a service or execute an action to provide a service. The application can include an application that provides access to a service provided by the service provider device 108. For example, the application can include a music service application, ride sharing application, food delivery application, or internet-of-things application.

The application can be configured for a digital platform. The service provider device 108 can develop, design, or otherwise configure the application for a specific digital platform. The service provider device 108 can develop the application as a mobile application, such as an application that is configured for execution on a mobile computing device (e.g., smartphone, smartwatch, tablet, or wearable device). The mobile application can refer to a native application executing on the computing device 104. Other digital platforms can include a web-based application. A web-based application can refer to an application that can execute at least partially in a web browser. A web-based application can refer to a program that can be accessed over a network connection using HTTP. A web-application can refer to a client-server computer program that the client computing device can run or execute within a web browser.

The application received from the service provide device 108 can perform or facilitate the performance of an action associated with a service. The service, such as music service or ride sharing service, for example, can be associated with multiple digital platforms. The service, such as music service, can be provided via more than digital platform. For example, the music service can provide music to be played on the computing device 104 via a mobile application digital platform as well as a web-application digital platform. The music service can also be provided via a digital assistant platform, for example, by using a conversational voice computing environment. Thus, the service of the service provider can be provided via multiple digital platforms.

The data processing system 102 can include a policy engine 116 to determine contexts for one or more services (e.g., provided by the service provider device 108) implemented across a variety of platforms. Context may refer to actions and corresponding parameters for a service. For example, the platform data 130 can include computer code for programs or applications that implement a service via multiple platforms. Thus, in one example, the platform data 130 can include a mobile application for a service, a desktop application for the service, and a web-based application for the service. The service can be, for example, a ride sharing service configured to allow a user to request a car to pick the user up and take the user to a specified destination. The policy engine 116 can be configured to identify or generate context (i.e., an action and a set of parameters) for a conversational platform to be implemented by the data processing system 102, based on the platform data 130. The platform data 130 may include data relating to other platforms for a service, but may not include data for a conversational platform.

To facilitate creation of a corresponding conversational platform for the service, the policy engine 116 can extract information from the platform data 130 for other platforms on which the service is implemented. The data processing system 102 can scan the platform data 130 for tags or other markup information relating to actions and parameters. The tags and markup information can include any type of information that provides context for executable portions of the platform data 130, but which are not themselves executable. For example, the tags and markup information may be provided in a format that is ignored by a compiler when a program included in the platform data 130 is compiled, but is readable by the data processing system 102 for purposes of extracting contextual information about actions and parameters associated with a particular service on a particular platform.

The tags and markup information may include information identifying a web page or a screen used by a mobile application, an input field in which a user provides required information, a user interface element such as a selectable button, or any other form action or parameter of a service. In an example in which the service is a ride sharing service, the platform data 130 can store computer code corresponding to a mobile application for the ride sharing service. The computer code can include instructions to ask the user to input the user's location, as well as a tag or other markup information to indicate that an input field corresponds to the user's current location. Similarly, the computer code can include instructions to prompt the user to enter inputs for a destination, a time, a vehicle size, or a vehicle amenity, as well as tags or markup information relating to each of each of these inputs. The policy engine 116 can scan the computer code for the tags and can determine an action (e.g., requesting a ride) as well as a set of parameters for the action (e.g., current location, destination, time, vehicle size, and vehicle amenity). The tags and markup data can also include a mapping of the functionality of a service on a first platform to the functionality of the service on a second platform. For example, the tags and mark up information can include a mapping of a screen of a mobile application to a web page of a web-based application. The tags and markup information also may include one or more links. For example, the tags and markup information for a web-based application may include one or more "deep links" to a mobile application. A deep link can be any reference or pointer to a user interface, such as a graphical user interface of the mobile application. Thus, a web-based application may include a deep link that maps functionality of the web-based application to a particular display screen, input field, or other user interface of a mobile application that implements corresponding functionality.

The data processing system 102 can use the contextual information gathered through the tags or markup information to implement the service through a conversational platform. For example, the data processing system 102 can deliver audio outputs (e.g., via the audio signal generator component 122) to the computing device 104 corresponding to text fields for parameters of a mobile application, and can receive audio responses from the computing device 104 (e.g., via the natural language processor component 112) to determine values for the parameters. Thus, the data processing system 102 can implement functionality similar to that provided by the mobile application in a conversational manner by extracting the tags or markup information from the mobile application data included in the platform data 130 and using the audio signal generator component 122 and the natural language processor component 112 to send and receive information to and from the computing device 104.

The debugger component 118 can be configured to detect and resolve discrepancies between the tags or markup information included in the platform data 130. For example, the platform data 130 can include executable code for a mobile application of a service and executable code for a desktop application of the service. However, for a given action provided through the service (e.g., requesting a car), the mobile application may have a different set of parameters than the desktop application. For example, the mobile application may include parameters corresponding to only a current location and a destination, while the desktop application includes parameters corresponding to a current location, a destination, and a type of vehicle. Thus, there may be an inconsistency or mismatch between the parameters of an action for a first platform and the parameters of the same action for a second platform. The debugger component 118 can determine this inconsistency or mismatch and can attempt to resolve it through a debugging process. Debugging can also be referred to herein as validation. The debugger component 118 can debug the application received from the service provider device 108 to validate parameters of the action on multiple digital platforms.

For example, the data processing system 102 (e.g., via the debugger component 118) can identify, for the action, first markup information indicating first parameters for a first platform (e.g., a web-based application platform) of the multiple digital platforms. The data processing system 102 can identify, for the action, second markup information indicating second parameters for a second platform (e.g., a conversational platform) of the multiple digital platforms. The data processing system 102 can determine, based on a comparison of the first markup information and the second markup information, a conflict between the first parameters and the second parameters. The data processing system 102 can determine that a conflict exists based on fewer parameters or different parameters being configured for the first digital platform compared to the second digital platform. For example, the data processing system 102 can determine that a conflict exists based on parameters being configured for the conversational platform compared to the web-based application platform. The data processing system 102 can determine that a conflict exists between the first parameters and the second parameters based on the parameters being different, a different number of parameters, different formats for the parameters, or different input types for the parameters (e.g., address provided by latitude and longitude versus a street address; or a data structure size for the input for the parameter). The data processing system 102 can determine one of the parameters is not compatible with a platform. For example, a parameters whose input is a latitude and longitude coordinate may not be compatible with a conversational platform because users may not provide a latitude and longitude coordinate as an address for a geographical location, but may provide a street address or a name of a entity (e.g., Brand_A Coffee Shop on Main Street in Anytown).

The data processing system 102 can automatically resolve the conflict based on a policy or request the service provider to resolve the conflict. For example, the data processing system 102 can provide, to the service provider device, an indication of the conflict. The data processing system 102 can transmit a prompt to the service provider device to resolve the conflict.

In an example, the debugger component 118 can prompt the developer (e.g., a user of the service provider device 108) of the desktop application and the mobile application to manually resolve the mismatch by transmitting information to the service provider device 108 indicating that the mismatch exists and requesting that the user address the mismatch by updating the code for either or both of the desktop application and the mobile application. In another example, the debugger component 118 can automatically resolve the conflict. Automatic resolution may occur based on an install state or version of the desktop application or mobile application stored in the platform data 130. For example, if the latest installed version of the desktop application is newer than that of the mobile application, the debugger component 118 can select the parameters of the desktop application and ignore those of the mobile application. In another example, the debugger component 118 may select the set of parameters as the "union" of the set of parameters for the desktop application and the set of parameters for the mobile application. After the debugger component 118 has selected an appropriate set of parameters for an action (either automatically or manually by prompting the service provider device 108 to address any conflict), the data processing system 102 can use the tags or markup information corresponding to the selected parameters to implement the service through a conversational platform, as described above.

The data processing system 102 can automatically resolve the conflict. The data processing system 102 can automatically resolve the conflict based on at least one policy stored in policy data structure 128 in the data repository 124. For example, the data processing system 102 can resolve the conflict by removing the parameter, reformatting the parameter, or applying pre-processing rules for the parameter. The data processing system 102 can automatically resolve the conflict by removing at least one of the parameters associated with the action from one of the platforms.

The policy used by the data processing system 102 to automatically resolve the inconsistency can include a resolution policy or conflict resolution policy or inconsistency resolution policy stored in policies data structure 128 in data repository. For example, the data processing system 102 can identify, for the action, first parameters for the first platform of the plurality of digital platforms, and second markup information indicating second parameters for a second platform of the plurality of digital platforms. The data processing system 102 can extract markup information, which can refer to information coded using a markup language such as a declarative language or descriptive markup language. Example markup languages can include extensible markup language ("XML"), hypertext markup language ("HTML"), or other markup language. The data processing system 102 can extract the markup language to identify tags or other indications of parameters used by the application to execute or perform the action.

Upon identifying the first parameters associated with a first platform, and second parameters associated with a second platform, the data processing system 102 can determine an inconsistency between the first parameters and the second parameters based on a comparison. The data processing system 102 can compare the first parameters with the second parameters. The data processing system 102 can compare the number of parameters, types of parameters, types of input values, or other aspects of the parameters to identify a difference, delta, or inconsistency. Responsive to determination of the inconsistency, the data processing system can retrieve a resolution policy for the service provider device. The data processing system 102 can perform a lookup in policies data structure 128 to obtain the resolution policy. Each service provider can provide or be associated with a resolution policy, or the data processing system 102 can use a resolution policy configured for multiple service providers, or types of service providers, types of digital platforms, types of parameters, or types of actions. The resolution policy can indicate how to resolve the inconsistency. For example, the inconsistency can be a type of input for a location parameter. A first digital platform can request the location input to be a street address, whereas a second digital platform can request the location input to be a latitude and longitude coordinate. The resolution policy can resolve the inconsistency by adjusting the input type for one of the parameters on one of the digital platforms so it matches the other digital platform. For example, to provide a consistent operation and data processing, the data processing system 102 can determine to adjust the parameter to it can take, as input, the street address on both the first and second digital platforms. In another example, the data processing system 102 can provide pre-processing of the input to convert the input to the format used by the digital platform.

The data processing system 102 can determine to select one of the formats for processing via a conversational platform. The data processing system 102 can use a policy retrieved from policies data structure 128 to determine the parameter that optimized or more efficient for a conversational platform. For example, the data processing system 102 can determine to use a street address or name of a commercial entity as the input for a conversational platform.

The data processing system 102 can determine the inconsistency between parameters for an action or a service on different digital platforms can be associated with a version of the application configured for the digital platform. For example, the data processing system 102 can determine that a first platform is associated with a latest version update compared to a second digital platform. The data processing system 102 can determine the version based on a date the version was released, a sequential version number, or a version name. The data processing system 102 can resolve, responsive to the determination that the first platform is associated with the latest version update, the inconsistency by updating the second parameters to match the first parameters.

The policy engine 116 can also be configured to determine a ranking of possible actions based on an audio input received from the computing device 104. For example, a user may transmit a voice command from the computing device 104 to the data processing system 102. The natural language processor component 112 can be configured to parse the voice command to determine a plurality of possible actions corresponding to the voice command. For example, the voice command can be a name of a service provided by the service provider device 108, and the possible actions can be any actions that may be invoked through that service. In addition, the policy engine 116 can also determine a platform for performing the action. To determine which action to perform and which platform to use, the policy engine 116 can determine a ranking of possible actions and platforms, and can select the action and platform with the highest ranking. The ranking can be based on previous selections by the user, a type of the computing device 104, or a platform that the user is currently interacting with. The ranking can also be based on other types of computing devices that may be available to the user. For example, the policy engine 116 can determine that the user does not have access to a mobile device, and may eliminate a mobile application as a potential platform for performing an action.

The data processing system 102 can include an application, script or program installed at the client computing device 104, such as an app to communicate input audio signals to the interface 110 of the data processing system 102 and to drive components of the client computing device to render output audio signals. The data processing system 102 can receive data packets or other signal that includes or identifies an audio input signal. For example, the data processing system 102 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with techniques based on machine learning, such as statistical machine learning. The NLP component 112 can utilize decision trees, statistical models, or probabilistic models to parse an input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve.

The audio input signal can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) and provided to the NLP component 112 or stored in the data repository 124.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken, or a platform through which a request should be fulfilled. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can filter the input audio signal to identify the trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger key-words, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 112 can determine this is a request for a laundry service and a dry cleaning service. The NLP component 112 can determine this is a single request for a service provider that can provide both laundry services and dry cleaning services. The NLP component 112 can determine that this is two requests; a first request for a service provider that performs laundry services, and a second request for a service provider that provides dry cleaning services. In some cases, the NLP component 112 can combine the multiple determined requests into a single request, and transmit the single request to a service provider device 108. In some cases, the NLP component 112 can transmit the individual requests to respective service provider devices 108, or separately transmit both requests to the same service provider device 108.

After the action to be performed has been identified, the data processing system 102 can acquire any other information necessary to complete the action. For example, as described above, an action may be associated with any number of parameters. The data processing system 102 can be configured to gather information corresponding to parameter values, for example by initiating a data exchange with the computing device 104. The data exchange can be implemented via a conversational platform, in which the data processing system 102 provides audio based prompts (e.g., audio corresponding to speech or natural language) to the computing device 104, and a user of the computing device 104 responds by providing input audio signals corresponding to answers. The natural language processor component 112 of the data processing system 102 can be configured to process the received audio signal to determine a correspond word or words, which can be stored as the value for a corresponding parameter.

The data processing system 102 can be configured to generate, based on the action and the parameter values, an action data structure responsive. Processors of the data processing system 102 can execute scripts that generate a data structure to a service provider device 108 to request or order a service or product, such as a car from a car share service. The policy engine 116 can obtain data from the data repository 124, as well as data received with end user consent from the client computing device 104 to determine location, time, user accounts, logistical or other information to allow the service provider device 108 to perform an operation, such as reserve a car from the car share service. The data processing system 102 can communicate with the service provider device 108 to complete the conversion by in this example making the car share pick up reservation.

The data processing system 102 can execute a specified action to satisfy the end user's intention, as determined by the data processing system 102. Depending on the action specified in its inputs, the data processing system 102 can execute code or a dialog script that identifies the parameters used to fulfill a user request. Such code can look-up additional information, e.g., in the data repository 124, such as the name of a home automation service, or it can provide audio output for rendering at the client computing device 104 to ask the end user questions such as the intended destination of a requested taxi. The data processing system 102 can determine necessary parameters and can package the information into an action data structure, which can then be sent to another component to the service provider computing device 108 to be fulfilled. The action data structure can also include an indication of the platform to be used for fulfilling the user request. For example, the action data structure can indicate that the action should be performed through a mobile application, and the service provider device 108 can then transmit information corresponding to the action to a mobile application executing on the computing device 104. Thus, if the user requests a car and the data processing system 102 determines that the request should be fulfilled through a mobile application, the data processing system 102 can generate the data structure to include an indication of that the action is to be performed through the mobile application, and the service provider device 108 can transmit confirmation of the ride to the mobile application executing on the computing device 104.

The action data structure can be based on a template data structure, which may be included in the templates 132 stored in the data repository 124. The data processing system 102 can determine a type of action in order to select a template from the template repository 132 stored in the data repository 124. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The policy engine 116, upon identifying the type of request, can access the corresponding template from the template repository 132. Templates can include fields in a structured data set that can be populated by the policy engine 116 to further the operation that is requested of the service provider device 108 (such as the operation of sending a taxi to pick up an end user at a pickup location and transport the end user to a destination location). The policy engine 116 can perform a lookup in the template repository 132 to select the template that matches one or more characteristics or parameters of the trigger keyword and request. For example, if the request corresponds to a request for a car or ride to a destination, the data processing system 102 can select a car sharing service template. The car sharing service template can include the parameters identified by the policy engine 116 as corresponding to the action of requesting a ride, such as any one or more of the following fields: device identifier, pick up location, destination location, number of passengers, or type of service. The policy engine 116 can populate the fields with values. To populate the fields with values, the policy engine 116 can ping, poll or otherwise obtain information from one or more sensors 134 of the computing device 104 or a user interface of the device 104. As described above, at least some of the values for the parameters can be obtained via an interactive data exchange between the data processing system 102 and the computing device 104, which may carried out via a conversational platform. The data processing system 102 can also detect the source location of the computing device 104 using a location sensor, such as a GPS sensor. Thus, the data processing system 102 can select a template for the action data structure based on the trigger keyword or the request, populate one or more parameters or fields in the template with information detected by one or more sensors 134 or obtained via a user interface, and generate, create or otherwise construct the action data structure to facilitate performance of an operation by the service provider device 108.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 124.

Thus, upon receiving data packets comprising an input audio signal detected by a sensor 134 of the client computing device 104, the data processing system 102 can parse or otherwise process the input audio signal to identify an action and a service. The action can refer to or correspond to the action data structure. The action can include the action data structure. The service can refer to the name of the service provider or entity associated with the service provider device 108. An action can refer to, for example, "play Song_1 by Artist_A", and the service can refer to, for example, "Music Service_A". In another example, the action can be "book a ride from location_A to location_B" and the service can be "Ridesharing Company A".

The data processing system 102 can select, based on a policy and at least one of the input audio signal or historical execution information, a first platform of the plurality of digital platforms to perform the action. For example, the service provider identified from the input audio signal may have configured one or more applications for execution via two or more digital platforms, such as a web-based application, a native mobile application, or a conversational digital assistant platform. In some cases, the data processing system 102 may have automatically configured the application for execution via multiple digital platforms by automatically identifying and resolving any inconsistencies.

The data processing system 102 can select a digital platform from multiple digital platforms based on a ranking policy. The data processing system 102 can retrieve, from the policies data structure 128, a ranking policy. The data processing system 102 can use the ranking policy can determine a rank for each of the multiple digital platforms. The data processing system 102 can use the ranking policy to determine a score for each of the multiple digital platforms, and then select a highest scoring (or lowest scoring depending on the type of score) digital platform to execute the action. The data processing system 102 can use the ranking policy to rank or score the digital platforms based on one or more factors, such as historical execution, frequency of historical executions, computing resource utilization of digital platforms, type of computing device 104, preference information, service provider preference information, or other factors.

The data processing system 102 can use the ranking policy to select a digital platform based on historical execution. For example, the data processing system 102 can use the ranking policy to determine which digital platform was used by the computing device 104 to previously execute the action, the type of action, or perform an action or service associated with the service provider device 108. The data processing system 102 can select the digital platform that was most recently used to execute the action, type of action, or perform an action or service associated with the service provider device. The data processing system 102 can obtain an indication of a previous platform that was executed to perform the action for the service responsive to a request from the computing device 104, and then select the platform based on the previous platform that executed the action.

The data processing system 102 can use the ranking policy to select a digital platform based on a frequency of historical execution. For example, the data processing system 102 can determine which digital platform is most often selected by the user or other uses for execution of the service or the action on the service. Frequency of execution can be a number of execution during a time period, such as the last 24 hours, 48 hours, 72 hours, 1 week, 2 weeks, or 30 days.

The data processing system 102 can use the ranking policy to select a digital platform based on computing resource utilization. The data processing system 102 can determine to select digital platforms based on computing resource utilization. The data processing system 102 can determine to use computing resource utilization as a factor to select the digital platform based on the type of computing device 104 or a state of the computing device 104. For example, if the computing device 104 is a mobile device that is utilizing battery power and is not connected to power supply, then the data processing system 102 can determine to use computing resource utilization as a factor. However, if the computing device 104 is a mobile device that is connected to a power supply, such as a wall outlet, then the data processing system 102 may not use computing resource utilization as a factor because the battery is not currently being used.

The data processing system 102 can determine which digital platform utilizes the least computing resources of a client computing device 104. Computing resources can include, for example, battery consumption, network bandwidth utilization, or processor consumption. For example, a web-application may use less computing resources of a computing device 104 compared to a native mobile application because the functionality of the web-application resides on a server associated with the service provider device 108, whereas a native mobile application is executed on the computing device 104 using processor and memory utilization of the mobile computing device (e.g., computing device 104). However, the web-application may utilize more network bandwidth as compared to the native mobile application because the web-application may use the network to transmit input and output used for processing. A conversational digital assistant platform may utilize a voice-based user interface that does not use a display device or keyboard our touch input or output. Thus, the conversational digital assistant platform may utilize no display resource, and thereby lower battery consumption, as compared to a web-application and a native mobile application. Further, the majority of the data processing can be performed by the data processing system 102 or the service provider device 108 (e.g., a server of the service provider). However, the conversational digital assistant platform may utilize network bandwidth for transmitting data packets containing audio signals, and may use multiple data transmissions due to the conversational nature of obtaining and providing information which can include multiple queries and responses.

To select the digital platform that may utilize the fewest computing resources of the local computing device, the data processing system 102 can maintain a history, record, or log of computing resource utilization associated with different digital platforms. For example, the data processing system 102 can maintain, in data repository 124 or platform data structure 130, an indication of an amount of computing resource utilization associated with a type of service or action for each digital platform. The data processing system 102, thereafter, select the digital platform associated with the least historical computing resource utilization by the client computing device 104. Thus, the data processing system 102 can select the platform based on a determination that execution of the action via the platform utilizes less computing resources compared to execution of the action via a second platform of the multiple digital platforms.

The data processing system 102 can determine which digital platform to select based on the type of computing device 104. The computing device 104 can refer to the device that receives the input audio signal. The computing device 104 can refer to the device that is to facilitate performing the action or service. Types of computing devices 104 can include, for example, mobile computing device, laptop computing, desktop computer, smartphone, smartwatch, wearable computing device, tablet computing device, smart speaker, or smart television. Types of computing devices 104 can also refer to or types of available interfaces. For example, types of computing devices 104 can include voice-only computing device, audio and visual computing devices, visual only computing devices, or touchscreen input computing device.

The data processing system 102 can select the digital platform based on preference information associated with the computing device 104 or user thereof. The data processing system 102 can access an account or profile associated with a user of the computing device 104 to determine preference information. The preference information can be stored in memory of the computing device 104, or in the data repository 124. The preference information can be indicated in the input audio signal. For example, the user can indicate, in the initial input audio signal, the action, service and the digital platform to use to perform the action. The data processing system 102 can determine the preference based on parsing the input audio signal, or performing a lookup in a data repository 124 for preference information. The preference information can include preferences for types of actions, types of services, or a general preference.

The data processing system 102 can select the digital platform to use based on preference information provided by or associated with the service provider device 108. For example, the service provider 108 can indicate a preference for a type of digital platform to use for a type of action or service.

Thus, the data processing system 102 can use one or more ranking policies to select the digital platform. The data processing system 102 weight the results of the ranking policies in order to select the digital platform. For example, the data processing system 102 can weight user preference the highest, service provider preference the second highest, historical execution the third highest, and computing resource utilization the fourth highest. If user or service provider preference information does not exist, the data processing system 102 can use historical execution information to select the digital platform, or computing resource utilization information.

The data processing system 102 can initiate, responsive to selection of the digital platform, an interactive data exchange to populate parameters of an action data structure corresponding to the action. The interactive data exchange can refer to or include providing queries or request for information to obtain data used to populate the parameters in the action data structure. The initial input audio signal may not include sufficient information to generate or execute the action data structure; however, the initial input audio signal may include sufficient information to identity the action and service provider. The data processing system can then query the computing device for additional information as needed to populate the action data structure. For example, an action data structure for a ridesharing request can include parameter such as current location, destination, number of passengers, and time. However, the input audio signal may only include a request for a ride and a destination. The data processing system can then query the computing device for a current location. The computing device may include a location module or sensor that is configured to determine the location of the computing device and automatically provide the location information to the data processing system or service provider. The data processing system can cause the computing device to output an audio prompt requesting a pickup location from the user of the computing device. The data processing system can transmit or provide additional prompts for information, and the computing device, or user thereof, can input additional information used to populate the action data structure. The type, format or amount of queries and responses can vary based on the type of digital platform. For example, a native application may provide the location information automatically, whereas a conversational application may request the user to indicate a pick up location. Thus, the interactive data exchange can include multiple queries and responses from the computing device automatically, or from a user of the computing device, in order to populate the action data structure to perform the requested action on the requested service using the selected digital platform.

The data processing system 102 can execute the action via the selected platform using the action data structure. The data processing system 102 can transmit the action data structure to a third party provider device (e.g., service provider device 108) to cause the third party provider device (e.g., service provider device 108) to invoke a conversational application programming interface (e.g., service provider NLP component 142) and establish a communication session between the third party provider device (e.g., service provider device 108) and the client computing device 104. The action data structure can also cause the service provider device 108 to establish a communication session between the service provider device 108 and the computing device 104 via a different platform. Responsive to establishing the communication session between the service provider device 108 and the client computing device 1004, the service provider device 108 can transmit data packets directly to the client computing device 104 via network 105. In some cases, the service provider device 108 can transmit data packets to the client computing device 104 via data processing system 102 and network 105.

In some cases, the third party provider device (e.g., service provider device 108) can execute at least a portion of the conversational API. For example, the third party provider device (e.g., service provider device 108) can handle certain aspects of the communication session or types of queries. The third party provider device (e.g., service provider device 108) may leverage the NLP component 112 executed by the data processing system 102 to facilitate processing the audio signals associated with the communication session and generating responses to queries. In some cases, the data processing system 102 can include the conversational API configured for the third party provider (e.g., service provider device 108). In some cases, the data processing system routes data packets between the client computing device and the third party provider device to establish the communication session. The data processing system 102 can receive, from the third party provider device (e.g., service provider device 108), an indication that the third party provider device established the communication session with the client device (e.g., computing device 104). The indication can include an identifier of the client computing device 104, timestamp corresponding to when the communication session was established, or other information associated with the communication session, such as the action data structure associated with the communication session.

In some cases, the conversational API can be a second NLP that includes one or more component or function of the first NLP 112. The second NLP 142 can interact or leverage the first NLP 112. In some cases, the system 100 can include a single NLP 112 executed by the data processing system 102. The single NLP 112 can support both the data processing system 102 and the third party service provider device 108. In some cases, the policy engine 116 generates or construct an action data structure to facilitate performing a service, and the conversational API generates responses or queries to further a communication session with an end user or obtain additional information to improve or enhance the end user's experience or performance of the service.

The data processing system 102 can include, execute, access, or otherwise communicate with a session handler component 114 to establish a communication session between the client device (e.g., computing device 104) and the data processing system 102. The communication session can refer to one or more data transmissions between the client device (e.g., computing device 104) and the data processing system 102 that includes the input audio signal that is detected by a sensor 134 of the client device (e.g., computing device 104), and the output signal transmitted by the data processing system 102 to the client device (e.g., computing device 104). The data processing system 102 (e.g., via the session handler component 114) can establish the communication session responsive to receiving the input audio signal. The data processing system 102 can set a duration for the communication session. The data processing system 102 can set a timer or a counter for the duration set for the communication session. Responsive to expiration of the timer, the data processing system 102 can terminate the communication session.

Figure 2:
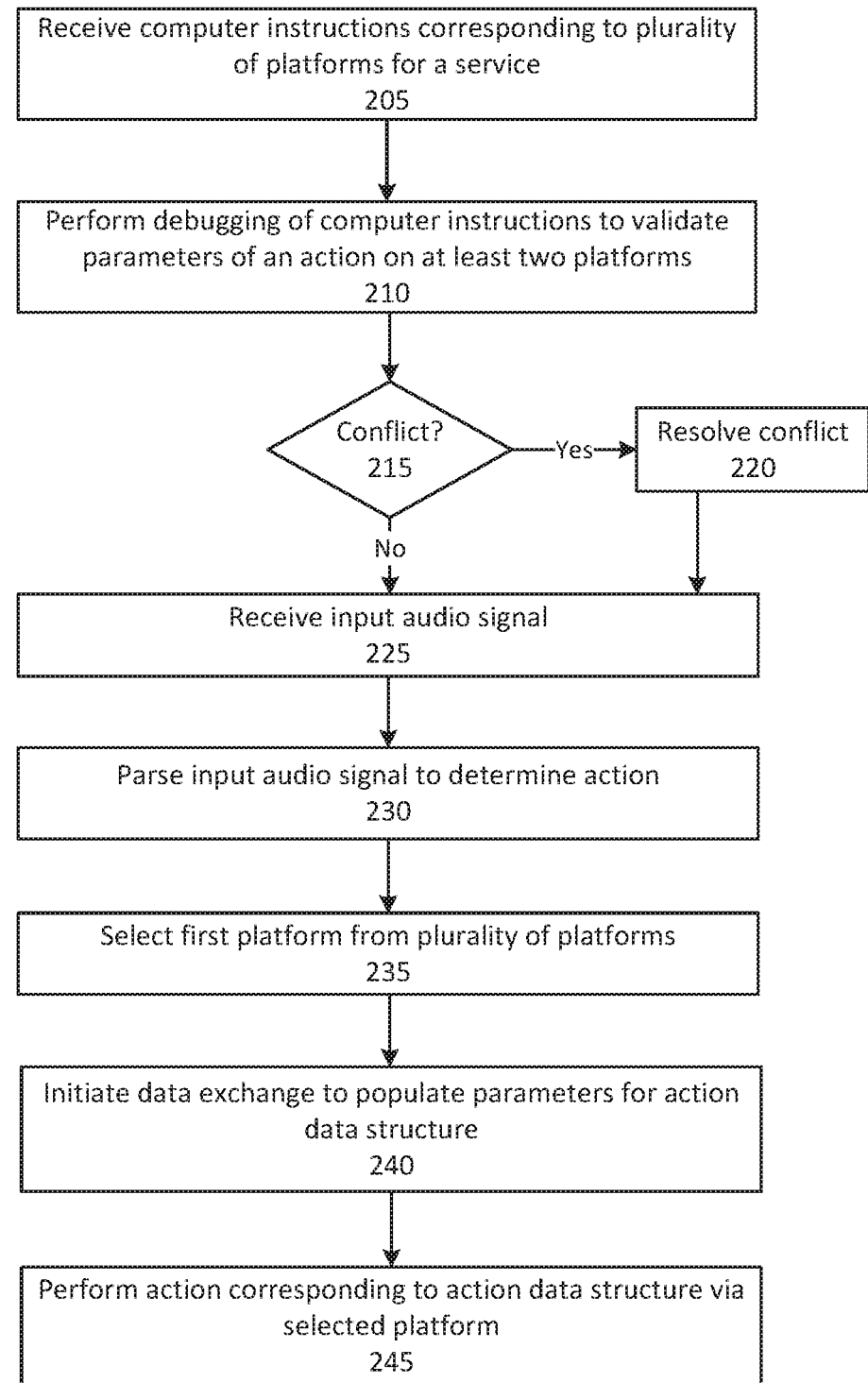
FIG. 2 is an illustration of a method of selecting digital platforms for execution of voice-based commands, and fulfilling requests in a voice based computing environment.

FIG. 2 is an illustration of an example method for performing dynamic modulation of packetized audio signals. The method 200 can be performed by one or more components, systems or elements of the system 100 or the system 300 described below in connection with FIG. 3. For example, method 200 can be performed by data processing system 102, computing device 104, or service provider device 108. At ACT 205, the method 200 can include a data processing system receiving, from a service provider device, an application that performs an action associated with a service via a plurality of digital platforms. For example, the data processing system can receive computer instructions corresponding to a plurality of platforms for a service. The computer instructions can include any type or form of computer logic or executable code to implement a service on two or more platforms. For example, the computer instructions can include a mobile application for a service, a desktop application for the service, and a web-based application of the service. Generally, the applications can be configured to provide similar or identical functionality across the disparate platforms.

At ACT 210, the method 200 can include the data processing system debugging the application to validate parameters of the action on at least two platforms of the plurality of digital platforms. The method 200 can include performing debugging of the computer instructions to validate parameters of an action on at least two platform. The computer instructions for each platform can include instructions relating to at least one action for each platform. The action can have a plurality of associated parameters. For example, an action may correspond to making a restaurant reservation, and the parameters can include a time, a party size, and a restaurant name. The parameters may be indicated by tags or other markups in the computer instructions. In some instances, the parameters for a service on a first platform (e.g., a mobile application) may differ from the parameters for the same service on a second platform (e.g., a web-based application). This can be due to differences in the versions of the two applications or an inadvertent error by a developer. To improve consistency across platforms for a service, the data processing system can determine whether there is a conflict between the parameters of an action across at least two platforms (ACT 215). If there is a conflict, the data processing system can resolve the conflict (ACT 220). For example, a component of the data processing system 102 (such as the debugger component 118) can prompt the developer of the applications to manually resolve the inconsistency or mismatch by transmitting information to the service provider device 108 indicating that the inconsistency or mismatch exists and requesting that the user address the inconsistency or mismatch by updating the computer instructions for the different platforms of the service. The data processing system 102 can also implement a set of rules or policies that can allow for automatic resolution of such a conflict. For example, if the latest installed version of the mobile application is more recent than that of the web-based application, the data processing system 102 can select the parameters of the mobile application and ignore those of the web-based application.

At ACT 225, the method can include the data processing system receiving, via an interface, data packets comprising an input audio signal detected by a sensor of a client device. The data processing system 102 can receive an input audio signal from a client computing device, such as the computing device 104. For example, a natural language processor component executed by the data processing system 102 can receive the input audio signal from a client computing device via an interface of the data processing system. The data processing system can receive data packets that carry or include the input audio signal detected by a sensor of the client computing device (or client device).

At ACT 230, the method 200 can include the data processing system parsing the input audio signal to identify an action and a service. The natural language processor component can parse the input audio signal to identify a request and a trigger keyword corresponding to the request. For example, the audio signal detected by the client device can include "Okay device, I need a ride from Taxi Service Company A to go to 1234 Main Street." In this audio signal, the initial trigger keyword can include "okay device", which can indicate to the client device to transmit an input audio signal to the data processing system. A pre-processor of the client device can filter out the terms "okay device" prior to sending the remaining audio signal to the data processing system. In some cases, the client device can filter out additional terms or generate keywords to transmit to the data processing system for further processing.

The data processing system can identify a trigger keyword in the input audio signal. The trigger keyword can include, for example, "to go to" or "ride" or variations of these terms. The trigger keyword can indicate a type of service or product. The data processing system can identify a request in the input audio signal. The request can be determined based on the terms "I need". The trigger keyword and request can be determined using a semantic processing technique or other natural language processing technique. Identifying the action can refer to determine what is to be performed. Identifying the service can refer to a type of service that performs the action, such as music streaming service, or a particular service provider to perform the action, such as Music Streaming Company A. The data processing system can identify an action, such as "ride", and a service, such as "Ride Sharing Company." In another example, the action can be "play Song_1 by Artist_A", and the service can be "Music Streaming Service A." To identify the action and the service, the data processing system 102 can utilize natural language processing, semantic analysis, or other processing techniques to identify keywords or entities in the input audio signal. To confirm the identification of the service, the data processing system can perform a lookup in a data repository to confirm that the indicated service is validated service provider.

At ACT 235, the method 200 can include the data processing system selecting, based on a policy and at least one of the input audio signal or historical execution information, a first platform of the plurality of digital platforms to perform the action. The method 200 can include selecting a first platform from the plurality of platforms for performing the action. The platform can be selected based on a set of rules or policies, such as ranking policies, relating to the action, as well as the audio input received from the computing device 104. The rules or policies can be configured to reduce resource computing resource consumption or provide an improved experience for the user, for example by allowing the action to be performed through the platform that is most convenient for the user. For example, the data processing system 102 can determine a ranking of possible platforms for performing the action. The ranking can be based on previous selections by the user, a type of the computing device 104, or a platform that the user is currently interacting with. The ranking can also be based on other types of computing devices that may be available to the user. The ranking can also be based on a type or amount of information to be provided to the user in connection with the action. For example, if the user is requesting a small amount of information, such as a current weather condition, the data processing system 102 can determine that the platform to be used should be a conversational platform. If the user is requesting more complex information, such as a hotel booking for which the user is likely to need a record of the transaction at a later date, the data processing system 102 can determine that the platform should be, for example, a mobile application platform or web-based application platform, rather than a conversational platform.

At ACT 240, the method 200 can include the data processing system 102 initiating a data exchange to populate parameters for an action data structure. The data processing system can initiate, responsive to selection of the first platform, an interactive data exchange to populate parameters of an action data structure corresponding to the action. The action data structure can be responsive to the request. For example, if the end user of the client computing device requests a taxi from Taxi Service Company A, the action data structure can include information to request a taxi service from Taxi Service Company A. The data processing system can select a template for Taxi Service Company A, and populate fields in the template with values to allow the Taxi Service Company A to send a taxi to the user of the client computing device to pick up the user and transport the user to the requested destination. The data processing system 102 can populate the action data structure by providing prompts to the computing device 104 and receiving inputs responsive to the prompts from the computing device 104. For example, the data exchange can be a conversational data exchange in which the data processing system 102 transmits audio signals corresponding to requests for any of the parameters of the action data structure that are not known by the data processing system 102.

The data processing system 102 may be able to automatically populate at least some of the parameters of the action data structure, for example based on information automatically provided to the data processing system 102 by the 134 of the computing device 104. Such information may include a device identifier for the computing device 104 or a geographic location of the computing device 104 based on GPS data. Other information can be obtained via the conversational data exchange or another form of data exchange. For example, the data processing system 102 can prompt the user of the computing device 104 to enter inputs corresponding to parameter values for the action data structure using a text-based interface, such as a keyboard, rather than using a conversational interface. The action data structure also can include an indication of the platform through which the action should be performed. For example, the platform can be the platform selected in ACT 235 of the method 200.

At ACT 245, the method 200 can include the data processing system performing the action corresponding to the action data structure via the selected platform. The data processing system can execute the action via the selected platform using the action data structure. For example, the data processing system 102 may transmit the action data structure to the third party provider device (e.g., service provider device 108) to cause the third party service provider device 108 to perform at least part of the action via the selected platform. The service provider device 108 can parse or process the received action data structure and determine to invoke an API, such as a conversational API, and establish a communication session between the service provider device 108 and the client computing device 104. The service provider device 108 can determine to invoke or otherwise execute or utilize the conversational API based on the contents of the action data structure. For example, the service provider device 108 can process a transaction (e.g., transmitting payment to a ride sharing company, a hotel, a restaurant, etc.) associated with the action data structure and can transmit a confirmation of the transaction to the computing device 104. The confirmation can be transmitted via the platform selected in ACT 235. For example, if the selected platform is a web-based application, the service provider device 108 can transmit to the computing device 104 information causing the computing device 104 to launch a web browser and load a web page of the selected web-based application.

Figure 3:
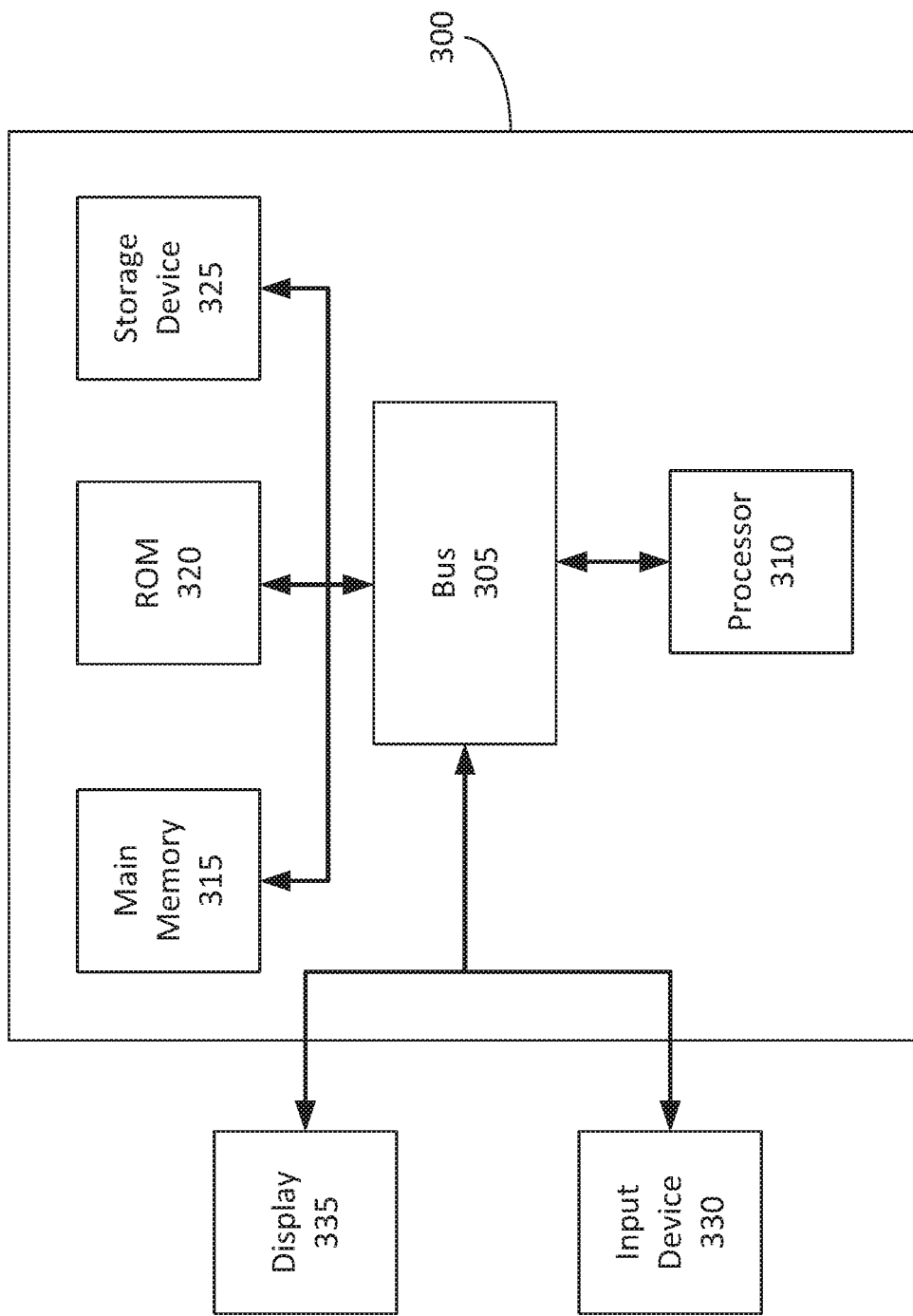
FIG. 3 is a block diagram illustrating a general architecture for a computer system that can be employed to implement elements of the systems and methods described and illustrated herein.

FIG. 3 is a block diagram of an example computer system 300. The computer system or computing device 300 can include or be used to implement the system 100, or its components such as the data processing system 102. The data processing system 102 can include an intelligent personal assistant or voice-based digital assistant. The computing system 300 includes a bus 305 or other communication component for communicating information and a processor 310 or processing circuit coupled to the bus 305 for processing information. The computing system 300 can also include one or more processors 310 or processing circuits coupled to the bus for processing information. The computing system 300 also includes main memory 315, such as a random access memory (RAM) or other dynamic storage device, coupled to the bus 305 for storing information, and instructions to be executed by the processor 310. The main memory 315 can be or include the data repository 124. The main memory 315 can also be used for storing position information, temporary variables, or other intermediate information during execution of instructions by the processor 310. The computing system 300 may further include a read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions. The storage device 325 can include or be part of the data repository 124.

The computing system 300 may be coupled via the bus 305 to a display 335, such as a liquid crystal display, or active matrix display, for displaying information to a user. An input device 330, such as a keyboard including alphanumeric and other keys, may be coupled to the bus 305 for communicating information and command selections to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335. The display 335 can be part of the data processing system 102, the client computing device 104 or other component of FIG. 1, for example.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus," encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the policy engine 116, debugger component 118, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 300 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 104 or the content provider computing device 106 or the service provider computing device 108).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the debugger component 118, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only as well as both 'A' and Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, functionality of the data processing system can be executed at least partially on the client computing device or service provider device.

What is claimed is:

1. A system to select digital platforms for execution of voice-based commands, comprising:
   a data processing system comprising at least one processor and memory to:
   receive, via an interface of the data processing system, data packets comprising an input audio signal detected by a sensor of a client device;
   parse the input audio signal to identify an action and a service associated with the action;
   select, based on a policy and at least one of the input audio signal or historical execution information, a first platform of a plurality of digital platforms associated with the service to perform the action;
   initiate, responsive to selection of the first platform, an interactive data exchange to populate parameters of an action data structure corresponding to the action; and
   execute the action via the first platform using the action data structure.

2. The system of claim 1, wherein the plurality of digital platforms include at least one of a web-based application platform for the service, a mobile application platform for the service, and a conversational platform for the service.

3. The system of claim 1, comprising the data processing system to:
   identify, for the action, first markup information indicating first parameters for the first platform of the plurality of digital platforms;
   identify, for the action, second markup information indicating second parameters for a second platform of the plurality of digital platforms;
   determine, based on a comparison of the first markup information and the second markup information, a conflict between the first parameters and the second parameters; and
   provide, to a service provider device, an indication of the conflict.

4. The system of claim 1, comprising the data processing system to:
   identify, for the action, first parameters for the first platform of the plurality of digital platforms, and second markup information indicating second parameters for a second platform of the plurality of digital platforms;
   determine a conflict between the first parameters and the second parameters based on a comparison; and
   transmit a prompt to a service provider device to resolve the conflict.

5. The system of claim 4, comprising the data processing system to:
   determine that fewer parameters are configured for the conversational platform compared to the web-based application platform;
   wherein the first platform is a web-based application platform for the service and the second platform is a conversational platform for the service.

6. The system of claim 1, comprising the data processing system to:

identify a conflict within the parameters of the action on at least two of the plurality of digital platforms; and
automatically resolve the conflict based on at least one policy stored by the data processing system.

7. The system of claim 1, comprising the data processing system to:
identify a conflict within the parameters of the action on at least two of the plurality of digital platforms; and
automatically resolve the conflict by removing at least one parameter associated with the action on one of the at least two of the plurality of digital platforms.

8. The system of claim 1, comprising the data processing system to:
identify, for the action, first parameters for the first platform of the plurality of digital platforms, and second markup information indicating second parameters for a second platform of the plurality of digital platforms;
determine an inconsistency between the first parameters and the second parameters based on a comparison;
retrieve, responsive to determination of the inconsistency, a resolution policy for a service provider device; and
resolve the inconsistency based on the resolution policy.

9. The system of claim 8, comprising the data processing system to:
determine the first platform is associated with a latest version update compared to the second platform; and
resolve, responsive to the determination that the first platform is associated with the latest version update, the inconsistency by updating the second parameters to match the first parameters.

10. The system of claim 1, comprising:
the data processing system to select the first platform of the plurality of digital platforms based on a ranking policy.

11. The system of claim 1, wherein the historical execution information includes an indication of a previous platform executed to perform the action for the service responsive to a request from the client device, comprising:
the data processing system to select the first platform based on the previous platform that executed the action being the first platform.

12. The system of claim 1, comprising:
the data processing system to select the first platform based on a determination that execution of the action via the first platform utilizes less computing resources compared to execution of the action via a second platform of the plurality of digital platforms.

13. A method of selecting digital platforms for execution of voice-based commands, comprising:
receiving, via an interface of a data processing system comprising at least one processor, data packets comprising an input audio signal detected by a sensor of a client device;
parsing, by the data processing system, the input audio signal to identify an action and a service associated with the action;
selecting, by the data processing system, based on a policy and at least one of the input audio signal or historical execution information, a first platform of a plurality of digital platforms associated with the service to perform the action;
initiating, by the data processing system, responsive to selection of the first platform, an interactive data exchange to populate parameters of an action data structure corresponding to the action; and
executing, by the data processing system, the action via the first platform using the action data structure.

14. The method of claim 13, wherein the plurality of digital platforms include at least one of a web-based application platform for the service, a mobile application platform for the service, and a conversational platform for the service.

15. The method of claim 13, comprising:
identifying, for the action, first markup information indicating first parameters for the first platform of the plurality of digital platforms;
identifying, for the action, second markup information indicating second parameters for a second platform of the plurality of digital platforms;
determining, based on a comparison of the first markup information and the second markup information, a conflict between the first parameters and the second parameters; and
providing, to a service provider device, an indication of the conflict.

16. The method of claim 13, comprising:
identifying, for the action, first parameters for the first platform of the plurality of digital platforms, and second markup information indicating second parameters for a second platform of the plurality of digital platforms;
determining a conflict between the first parameters and the second parameters based on a comparison; and
transmitting a prompt to a service provider device to resolve the conflict.

17. The method of claim 16, wherein the first platform is a web-based application platform and the second platform is a conversational platform for the service, the method comprising:
determining that fewer parameters are configured for the conversational platform compared to the web-based application platform.

18. The method of claim 13, comprising:
identifying a conflict within the parameters of the action on at least two of the plurality of digital platforms; and
automatically resolving the conflict based on at least one policy stored by the data processing system.

19. The method of claim 13, comprising:
identifying, for the action, first parameters for the first platform of the plurality of digital platforms, and second markup information indicating second parameters for a second platform of the plurality of digital platforms;
determining an inconsistency between the first parameters and the second parameters based on a comparison;
retrieving, responsive to determination of the inconsistency, a resolution policy for a service provider device; and
resolving the inconsistency based on the resolution policy.

20. The method of claim 13, comprising:
selecting the first platform of the plurality of digital platforms based on a ranking policy.

* * * * *